United States Patent [19]

Werrbach

[11] Patent Number: 5,612,612
[45] Date of Patent: Mar. 18, 1997

[54] FUNCTIONAL CONTROL BLOCK FOR VOLTAGE REGULATOR WITH DUAL SERVO LOOPS

[75] Inventor: Donn Werrbach, Glendale, Calif.

[73] Assignee: Aphex Systems, Ltd., Sun Valley, Calif.

[21] Appl. No.: 576,223

[22] Filed: Dec. 21, 1995

[51] Int. Cl.$^6$ ............................................. G05F 1/56
[52] U.S. Cl. ............................................. 323/285; 323/274
[58] Field of Search ..................... 323/285, 273–280, 323/299, 503, 901, 349, 282; 307/44–46, 48, 66; 330/85, 260, 300, 253; 363/8, 44, 45, 47–48, 84, 88–89, 80–81, 129

[56] References Cited

U.S. PATENT DOCUMENTS

| | | | |
|---|---|---|---|
| 3,315,149 | 4/1967 | Strait et al. | 323/22 |
| 3,986,101 | 10/1976 | Koetsch et al. | 323/20 |
| 4,254,372 | 3/1981 | Moore, Jr. | 323/277 |
| 4,321,525 | 3/1982 | Imazeki et al. | 323/281 |
| 4,326,245 | 4/1982 | Saleh | 363/79 |
| 4,327,319 | 4/1982 | Swisher et al. | 323/303 |
| 4,481,462 | 11/1984 | de Kleijn | 323/274 |
| 4,502,152 | 2/1985 | Sinclair | 455/23 |
| 4,543,522 | 9/1985 | Moreau | 323/303 |
| 4,728,901 | 3/1988 | Pepper | 330/260 |
| 4,771,226 | 9/1988 | Jones | 323/303 |
| 4,866,585 | 9/1989 | Das | 363/8 |
| 4,983,905 | 1/1991 | Sano et al. | 323/274 |

OTHER PUBLICATIONS

IBM Technical Disclosure Bulletin, vol. 21, No. 2 by J.S. Tung Published in Jul. 1978.
The Encyclopedia of Electronic Circuits, by Rudolf F. Graf Published in 1985, pp. 280, 288 and 501.

*Primary Examiner*—Aditya Krishnan
*Attorney, Agent, or Firm*—Thomas I. Rozsa; Tony D. Chen

[57] ABSTRACT

A functional control block (FCB) device for use in conjunction with a signal regulating apparatus which has a signal regulator for producing an output signal and delivers an actual signal on a load through an external conductor, and which further has an inner servo loop and an outer servo loop. The FCB device includes a first input connected to the signal regulator, and a second input connected to the outer servo loop. The FCB device has an internal functional signal processing circuitry for processing an output signal from the signal regulator, and the signal from the outer servo loop, and producing a functional sense signal and a functional reference signal. The FCB device further has a first output connected to a sense input of the inner servo loop for delivering the functional sense signal, and a second output connected to a reference input of the inner servo loop for delivering the functional reference signal. The functional sense signal and the functional reference signal produced by the FCB device are functions of the output signal of the signal regulator and the actual signal on the load.

48 Claims, 8 Drawing Sheets

FUNCTIONAL CONTROL BLOCK FOR VOLTAGE REGULATOR WITH DUAL SERVO LOOPS

BACKGROUND OF THE INVENTION

1. Field of The Invention

The present invention relates to the field of voltage regulators. More particularly the present invention relates to the field of voltage regulators with servo loops.

2. Description of The Prior Art

The following eleven (11) prior art references are related to regulated power supplies or voltage or current regulators:

1. U.S. Pat. No. 3,315,149 issued to Strait et al. on Apr. 18, 1967 for "High Stability Regulated Voltage Supply" (hereafter the "Strait Patent").

2. U.S. Pat. No. 3,986,101 issued to Koetsch et al on Oct. 12, 1976 for "Automatic V-I Crossover Regulator" (hereafter the "Koetsch Patent").

3. U.S. Pat. No. 4,254,372 issued to Moore, Jr. on Mar. 3, 1981 for "Series Pass Voltage Regulator with Overcurrent Protection" (hereafter the "Moore Patent").

4. U.S. Pat. No. 4,321,525 issued to Imazeki et al. on Mar. 23, 1982 for "Reference Voltage Generating Circuit In A DC Power Supply" (hereafter the "Imazeki Patent").

5. U.S. Pat. No. issued 4,326,245 to Saleh on Apr. 20, 1982 for "Current Foldback Circuit For A DC Power Supply" (hereafter the "Saleh Patent").

6. U.S. Pat. No. 4,327,319 issued to Swisher et al. on Apr. 27, 1982 for "Active Power Supply Ripple Filter" (hereafter the "Swisher Patent").

7. U.S. Pat. No. 4,481,462 issued to de Kleijn on Nov. 6, 1984 for "Amplitude Control System" (hereafter the "de Kleijn Patent").

8. U.S. Pat. No. 4,502,152 issued to Sinclair on Feb. 26, 1985 for "Low Current Linear/High Current Chopper Voltage Regulator" (hereafter the "Sinclair Patent").

9. U.S. Pat. No. 4,543,522 issued to Moreau on Sep. 24, 1985 for "Regulator with A Low Drop-out Voltage" (hereafter the "Moreau Patent").

10. U.S. Pat. No. 4,728,901 issued to Pepper on Mar. 1, 13, 1988 for "Power Buffer Circuit" (hereafter "Peper Patent").

11. U.S. Pat. No. 4,771,226 issued to Jones on Sep. 13, 1988 for "Voltage Regulator For Low Voltage, Discharging Direct Current Power Source" (hereafter the "Jones Patent").

12. U.S. Pat. No. 4,866,585 issued to Das on Sep. 12, 1984 for "AC to DC Solid State Power Supply Using High Frequency Pulsed Power Switching" (hereafter the "Das Patent").

13. U.S. Pat. No. 4,983,905 issued to Sano et al. on Jan. 8, 1991 for "Constant Voltage Source Circuit" (hereafter the "Sano Patent").

14. IBM Technical Disclosure Bulletin, Vol. 21, No. 2, authored by J. S. Tung and published in July 1978 for "Controlled Saturation Compensation For Power Amplifier" (hereafter the "IBM article").

15. The Encyclopedia of Electronic Circuits, 1st ed., authored by Rudolf F. Graf and published in 1985, pages 280, 288 and 501 (hereafter "the Graf book").

The Strait Patent discloses a high stability voltage regulated power supply. The Strait Patent circuit is connected between the input voltage $E_i$ and the output voltage $E_o$ includes a voltage regulator, a differential amplifier and a direct current (DC) amplifier. The output voltage $E_o$ is sampled by a ratio network of resistors which are connected in series across $E_o$. The sample voltage is then compared to that of a standard voltage reference, and the difference between the two voltages is treated as an error signal and fed to the DC amplifier. The error signal is amplified, inverted and fed to one input terminal of the differential amplifier. The output of the regulator is coupled to the other terminal of the differential amplifier; and therefore the high-speed transients induced by the rapidly switching loads are corrected. The Koetsch Patent discloses an automatic V-I crossover regulator. It teaches the operation of two or more identical power supplies operating in parallel to provide voltage regulated direct current to a single load. The voltage regulator circuit in the Koetsch Patent has no servo loop, but works as an operational amplifier using negative feedback. The input D.C. voltage is not actually a reference voltage (since no servo is used), but rather an input voltage for direct amplification. The two power sources and all the reference voltage must be isolated from one another, or the current sensing used will not be able to detect the output current of its own respective regulator.

The Moore Patent discloses a series pass voltage regulator with overcurrent protection. The Moore Patent circuit includes a series pass transistor used as a regulator, an amplifier for adjusting the base current of the transistor, a transistor used for shunting the drive current to the amplifier, and a differential amplifier for controlling the shunting function of the transistor according to the sensed output voltage. A reference voltage is provided to the differential amplifier. When the output voltage is higher than the desired value, the differential amplifier will increase its output. The bias current for transistors is therefore increased to increase the amount of current shunted through the transistor. The amplifier then conducts less base drive current to a transistor whose conduction is thereby reduced to decrease the output voltage of the regulator.

The Imazeki Patent discloses a reference voltage generating circuit in a DC power supply. It is a single servo loop voltage regulator with improvement on the reference voltage circuit.

The Saleh Patent discloses a current foldback circuit for a DC power supply. The Saleh Patent circuit includes a comparator which compares the output current with a reference and produces a current foldback signal if the output current exceeds the desired level. The current foldback signal is sent to a differential amplifier which produces a control signal to the output stage of the circuit for reducing and modifying the amount of output accordingly.

The Swisher Patent discloses an active power supply ripple filter. It is also a single servo loop voltage regulator.

The de Kleijn Patent discloses an amplitude control system. It is not a voltage regulated power supply or voltage regulator.

The Sinclair Patent discloses a low current linear/high current chopper voltage regulator. It is also a single servo loop voltage regulator with improvement on the reference voltage circuit.

The Moreau Patent discloses a regulator with a low drop-out voltage. It is again a single servo loop voltage regulator specially designed for use with a low drop-out voltage.

The Pepper Patent discloses a power buffer circuit which includes a differential amplifier and an error amplifier connected in local feedback relation directly to the differential amplifier. It teaches a specific connection between a MOSFET transistor and a bipolar transistor to create a unity gain. The differential amplifier amplifies the power of an input signal to produce an output signal. The error amplifier adjusts the differential amplifier to cause the voltage level of the output signal to follow the voltage level of the input signal. The error amplifier samples the output signal voltage and the input signal voltage to sense a difference between the signal voltages. In response to a difference, the error amplifier signals the differential amplifier to change the voltage level of the output signal. The Pepper Patent utilizes a power buffer circuit which is connected to an external voltage sense circuit to form a voltage regulator. The power buffer uses a linear negative feedback arrangement to establish a "unity" voltage gain between its input and output.

The Jones Patent discloses a voltage regulator for a low voltage, discharging direct current power source. It is again a single servo loop voltage regulator primarily designed for a single cell low voltage power supply.

The Das Patent discloses an AC to DC solid state power supply using high frequency pulsed power switching. It includes (a) auxiliary power supply, (b) input rectifier/filter, (c) input switching circuit, (d) isolating transformer, (e) control circuit, (f) magnetic circuit, (g) output rectifier/filter, (h) heat distribution element, and (i) packaging. The Das Patent utilizes transformers within the circuit. The Das Patent teaches an optoisolator for sensing the output voltage. In the Das Patent, outsense loop uses the optoisolator not as a comparator or threshold detector but simply as a linear isolator/voltage buffer.

The Sano Patent discloses a constant voltage source circuit. It is also not a voltage regulated power supply or voltage regulator.

The IBM article discloses a controlled saturation compensation for a power amplifier. It is again not a voltage regulated power supply or voltage regulator.

The Graf book discloses certain electronic circuits which utilize filters.

Today, many regulated power supplies have utilized inner servo loops to control the output of the voltage regulated power supply. However, to compensate the voltage drop occurring between the output of the power supply and the actual load, which is often caused by the conductive resistance of the long conducting wires, an outer servo loop is often needed. Nevertheless, there is no teaching in the prior art to provide an interfacing block in between the inner servo loop and the outer servo loop which can make the two servo loops act in a cohesive manner.

It is desirable to provide a new functional control block to be connected between the inner servo loop of a voltage regulator and the outer servo loop of the circuit, which can make the outer servo loop adaptable to the inner servo loop.

SUMMARY OF THE INVENTION

The present invention is a functional control block for voltage regulators with dual servo loops.

It is an object of the present invention to provide a functional control block for voltage regulators with an inner servo loop and an outer servo loop. Many voltage regulators now come with an inner servo loop. However, when an outer servo loop is added to the circuit of the voltage regulator, the control signals generated by the outer servo loop often need to be processed so that they are suitable for the operating parameters of the inner servo loop of the voltage regulator. Therefore, a functional control block is needed to be connected between the inner servo loop and the outer servo loop for manipulating the control signals generated by the outer servo loop so that they are suitable for the inner servo loop.

Described generally, the present invention is a functional control block connected between the inner servo loop and the outer servo loop of a voltage regulating apparatus. The signal regulating apparatus generally includes a signal regulator having an input, an output and a control terminal for receiving an input signal at its input and generating an output signal at its output and delivering an actual signal on a load through an external conductor. The signal regulating apparatus generally also includes an inner servo loop having a sense input and a reference input, and an output connected to the control terminal of the signal regulator for generating and delivering an inner servo loop control signal to the signal regulator to control the output signal of the signal regulator. The signal regulating apparatus generally further includes an outer servo loop having an input connected to the load and an output for generating and delivering an outer servo loop control signal which is responsive to the actual signal on the load.

The present invention functional control block device includes a first input, a second input, a first output and a second output. The first input is connected to the output of the signal regulator for receiving the output signal from the signal regulator. The second input is connected to the output of the outer servo loop for receiving the outer servo loop control signal from the outer servo loop.

The functional control block device also includes an internal functional signal processing circuity for processing the output signal of the signal regulator and the outer servo loop control signal of the outer servo loop and producing a functional sense signal and a functional reference signal. The first output of the functional control block device is connected to the sense input of the inner servo loop for delivering the functional sense signal to the inner servo loop. The second output of the functional control block device is connected to the reference input of the inner servo loop for delivering the functional reference signal to the inner servo loop. The functional sense signal and the functional reference signal produced by the functional control block device are functions of the output signal of the signal regulator and the actual signal on the load.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
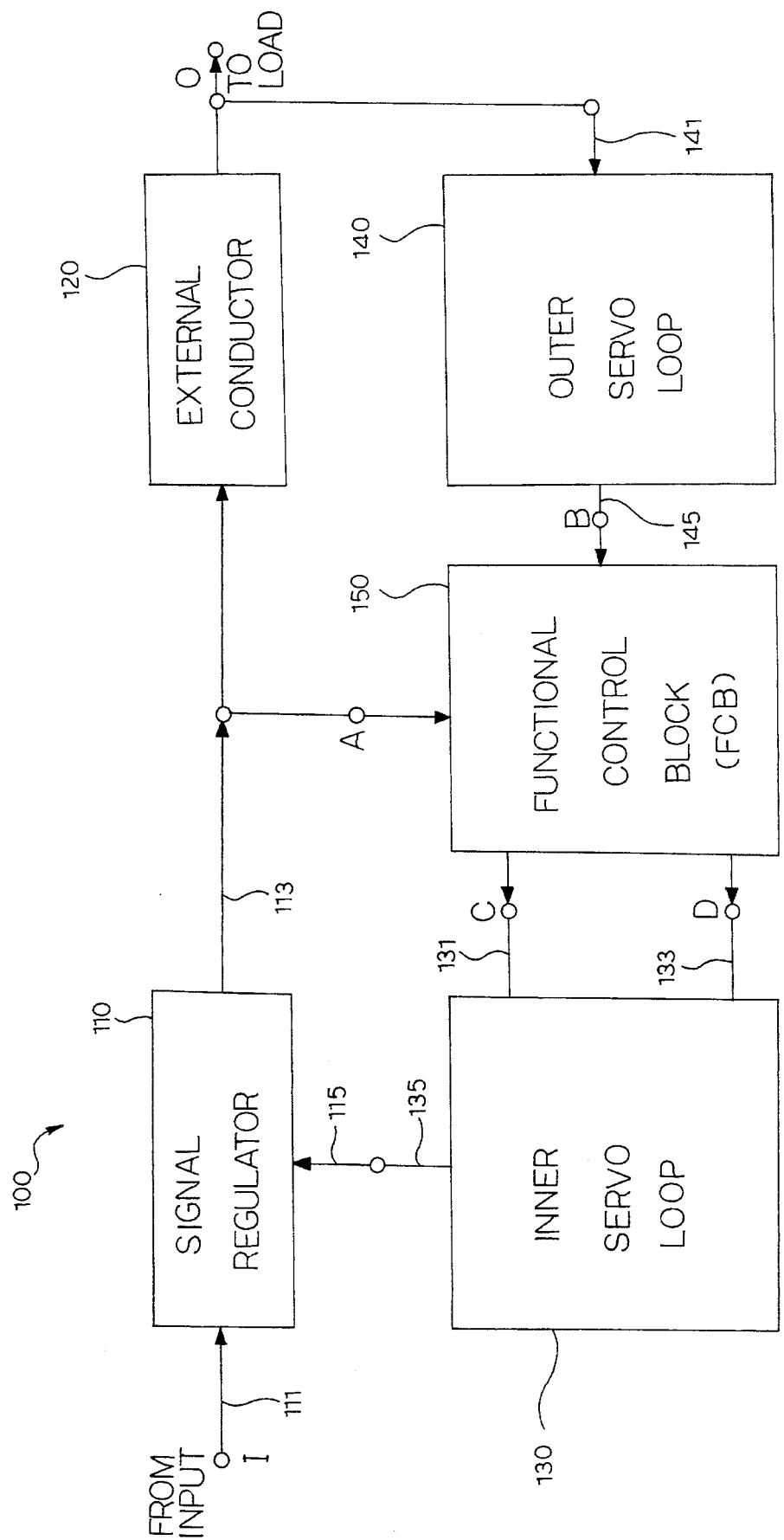
FIG. 1 is a block diagram of the present invention signal regulating apparatus.

Referring to FIG. 1, there is shown at 100 a block diagram of the present invention signal regulating apparatus. The signal regulating apparatus 100 includes a signal regulator 110. The signal regulator 110 has an input 111 for receiving an input signal from terminal I, an output 113, and a control terminal 115. The signal regulator receives an input signal at its input I, generates an output signal at its output 113, and delivers an actual signal on a load at terminal O through an external conductor 120. As an example, the signal regulator 110 may be a switch mode voltage regulator.

The signal regulating apparatus 100 also includes an inner servo loop 130. The inner servo loop 130 has a sense input 131, a reference input 133, and an output 135. The output 135 is connected to the control terminal 115 of the signal regulator 110. The inner servo loop 130 generates an inner servo loop control signal, and delivers the inner servo loop control signal to the signal regulator 110 to control the output signal of the signal regulator 110.

The signal regulating apparatus 100 further includes an outer servo loop 140. The outer servo loop 140 has an input 141 connected to the load, and an output 145. The outer servo loop 140 generates an outer servo loop control signal which is responsive to the actual signal on the load, and delivers the outer servo loop control signal at its output 145.

The signal regulating apparatus 100 includes a unique functional control block (FCB) device 150. The FCB device 150 has a first input A, a second input B, a first output C and a second output D. The FCB device 150 also has an internal functional signal processing circuity.

The first input A of the FCB device 150 is connected to the output 113 of the signal regulator 110 for receiving the output signal from the signal regulator 110. The second input B of the FCB device 150 is connected to the output 145 of the outer servo loop 140 for receiving the outer servo loop control signal from the outer servo loop 140.

The internal functional signal processing circuity of the FCB device 150 processes the output signal of the signal regulator 110 and the outer servo loop control signal of the outer servo loop 140, and produces a functional sense signal and a functional reference signal.

The first output C of the FCB device 150 is connected to the sense input 131 of the inner servo loop 130 for delivering the functional sense signal to the inner servo loop 130. The second output D of the FCB device 150 is connected to the reference input 133 of the inner servo loop 130 for delivering the functional reference signal to the inner servo loop 130.

Figure 2:
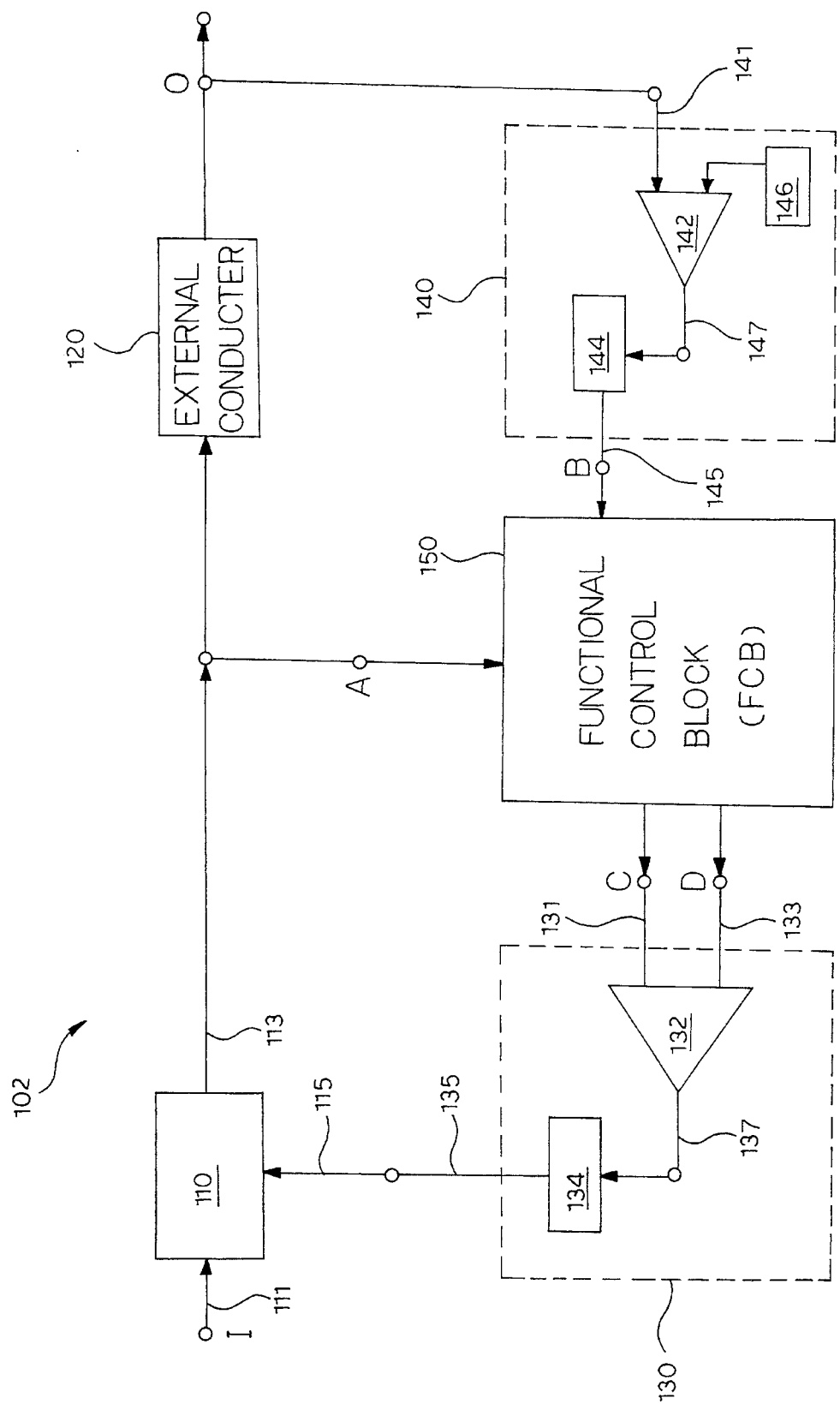
FIG. 2 is a block diagram of the present invention signal regulating apparatus with detailed examples of the inner servo loop and outer servo loop.

Referring to FIG. 2, there is shown a block diagram of the present invention signal regulating apparatus with detailed examples of the inner servo loop and outer servo loop. As an example, the inner servo loop 130 includes an inner servo loop comparator 132 and an inner servo loop filter 134, and the outer servo loop 140 includes an outer servo loop comparator 142, an outer servo loop filter 144, and a outer servo loop signal reference 146.

The inner servo loop comparator 132 has a first input connected to the first input 131 of the inner servo loop 130 and a second input connected to the second input 133 of the inner servo loop 130, and generates a logical high or low error signal at its output 137. The high or low logical error signal at output 137 is filtered by the inner servo loop filter 134 to produce the inner servo loop control signal which is delivered at output 135 of the inner servo loop 130. The inner servo loop output 135 is coupled to the control input 115 of the signal regulator which represents a suitable means of controlling the signal regulator. The control signal causes the output signal at output 113 of the signal regulator to reduce if the inner servo error signal indicates that the output is too high, and to increase if the inner servo error signal indicates that the output is too low.

The outer servo loop comparator 142 has a first input connected to the outer servo loop input 141 for receiving the actual load signal, and a second input connected to the signal reference 146. The outer servo loop comparator 142 generates a logical high or low error signal at its output 147 depending upon whether the actual load signal is higher or lower than the signal reference. The high or low logical error signal at output 147 is filtered by the outer servo loop filter 144 to produce the outer servo loop control signal which is delivered at output 145 of the outer servo loop 140. The outer servo loop output 145 is coupled to the second input B of the FCB device 150.

The output signal of the signal regulator 110 at the output 115 of the signal regulator 110 is received at the first input A of the FCB device 150. The outer servo loop control signal of the outer servo loop 140 is received at the second input B of the FCB device 150. The internal functional signal processing circuitry of the FCB device 150 processes the output signal of the signal regulator 110 and the outer servo loop control signal of the outer servo loop 140, and produces a functional sense signal at its first output C and a functional reference signal at its second output D.

Figure 3:
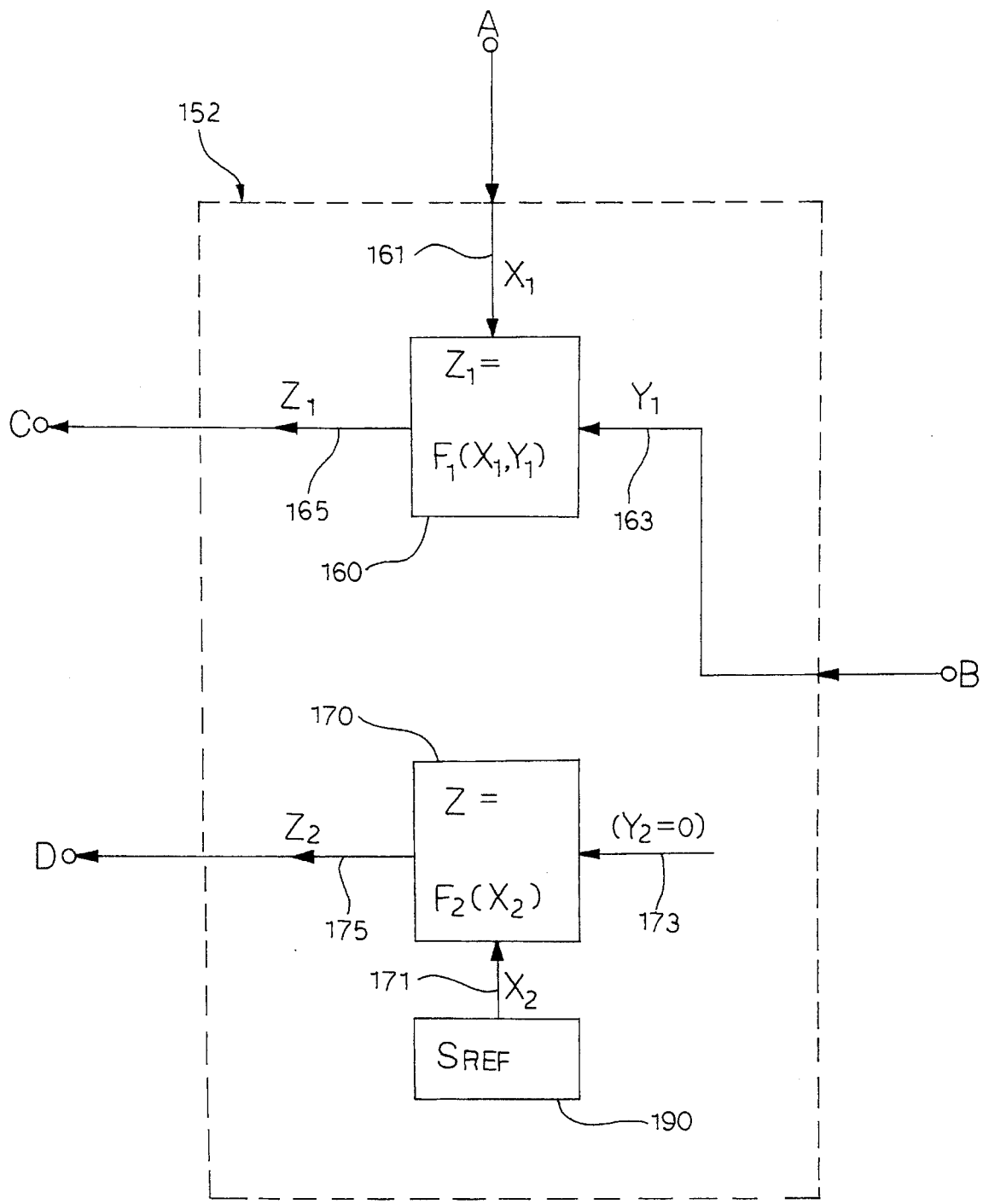
FIG. 3 is a block diagram of one embodiment of the internal functional signal processing circuitry of the present invention functional control block device.

Referring to FIG. 3, there is shown a block diagram of one embodiment 152 of the internal functional signal processing circuitry of the present invention FCB device 150. In this embodiment 152, the FCB device 150 includes two FCBs 160 and 170. The first FCB 160 has a first input 161, a second input 163 and an output 165. The second FCB 170 also has a first input 171, a second input 173 and an output 175.

The first input 161 of the first FCB 160 is coupled to the first input A of FCB device 150, and the second input 163 of the first FCB 160 is coupled to the second input B of FCB device 150. Therefore, the first input signal X1 of the first FCB 160 is the output signal of the signal regulator 110, and the second input signal Y1 of the first FCB 160 is the outer servo loop control signal of the outer servo loop 140. The output signal Z1 at the output 165 of the first FCB 160 is a function (F1) of the first and second input signals X1 and Y1:

$$Z1=F1 (X1, Y1)$$

The first input 171 of the second FCB 170 is coupled to a signal reference 190 which provides a reference signal, and the second input 173 of the second FCB 170 is not coupled to anything. Therefore, the first input signal X2 of the second FCB 170 is the reference signal of the signal reference 190, and the second input signal Y2 of the second FCB 170 is zero (Y2=0). The output signal Z2 at the output 175 of the second FCB 170 is a function (F2) of the first input signal X2:

$$Z2=F2(X2, Y2=0)$$

Figure 4:
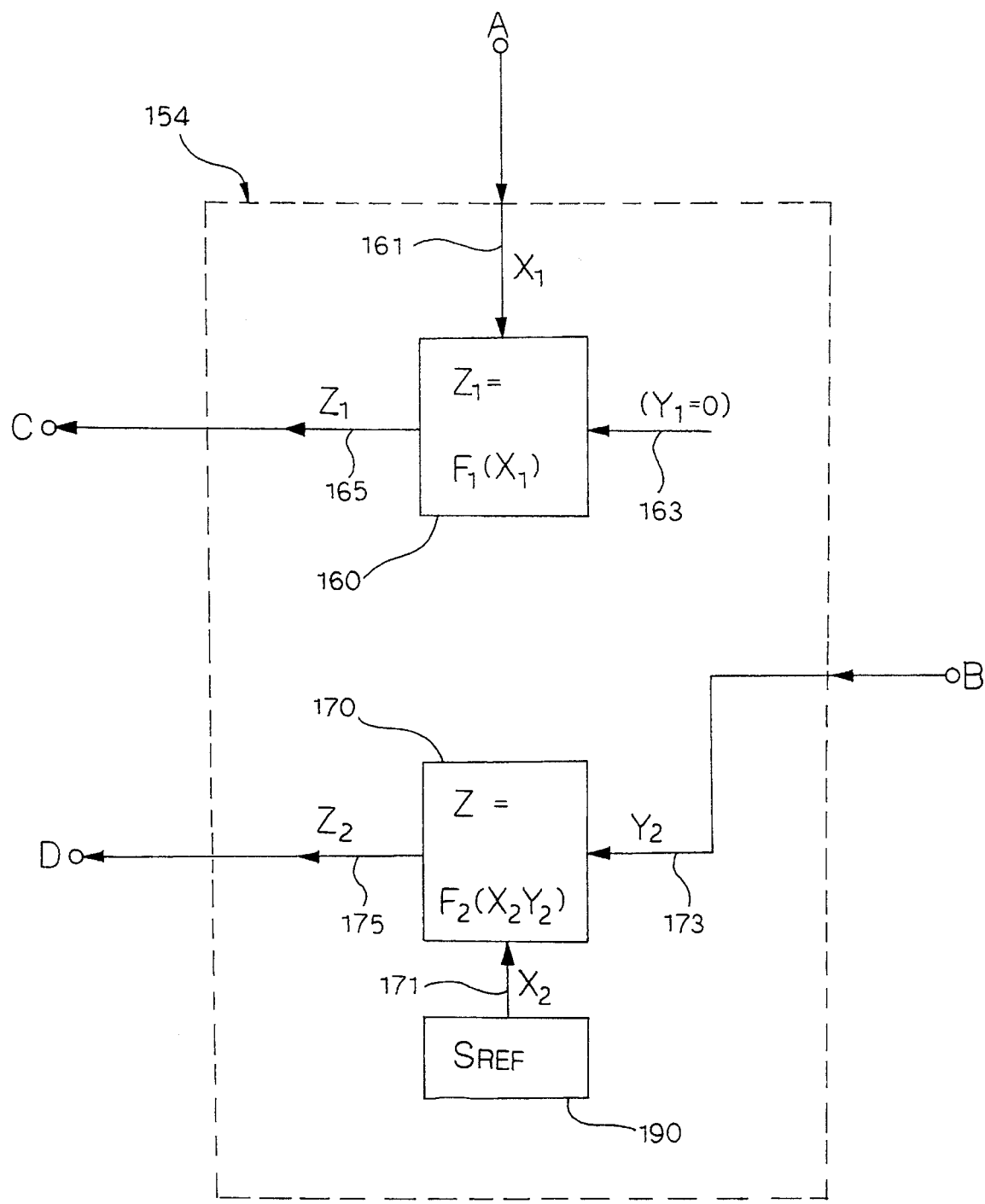
FIG. 4 is a block diagram of another embodiment of the present invention functional control block device.

Referring to FIG. 4, there is shown a block diagram of another embodiment 154 of the internal functional signal processing circuitry of the present invention FCB device 150. In this embodiment 154, the FCB device 150 also includes two FCBs 160 and 170. Similar to the embodiment shown in FIG. 3, the first FCB 160 has a first input 161, a second input 163 and an output 165, and the second FCB 170 also has a first input 171, a second input 173 and an output 175.

The first input 161 of the first FCB 160 is again coupled to the first input A of FCB device 150. However, the second input 163 of the first FCB 160 is not coupled to anything. Therefore, the first input signal X1 of the first FCB 160 is still the output signal of the signal regulator, but the second input signal Y1 of the first FCB 160 is zero (Y1=0). The output signal Z1 at the output 165 of the first FCB 160 is a function (F1) of the first and second input signals X1 and Y1:

$$Z1=F1 (X1, Y1=0)$$

The first input 171 of the second FCB 170 is coupled to the signal reference 190, and the second input 173 of the second FCB 170 is coupled to the second input B of the FCB device 150. Therefore, the first input signal X2 of the second FCB 170 is the reference signal of signal reference 190, and the second input signal Y2 of the second FCB 170 is the outer servo loop control signal of the outer servo loop 140. The output signal Z2 at the output 175 of the second FCB 170 is a function (F2) of the first and second input signals X2 and Y2:

$$Z2=F2 (X2, Y2)$$

Figure 5:
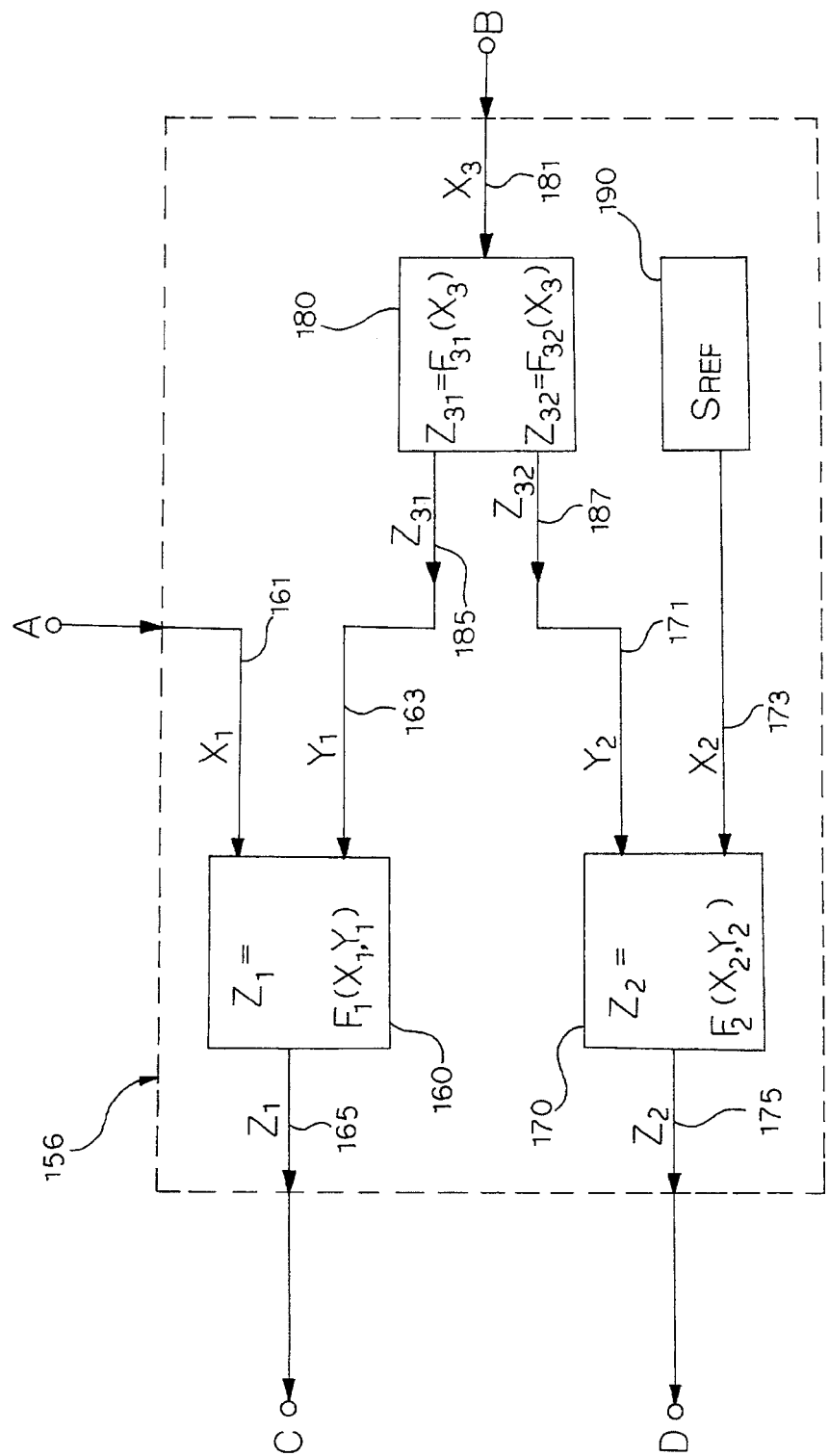
FIG. 5 is a block diagram of still another embodiment of the present invention functional control block device.

Referring to FIG. 5, there is shown a block diagram of still another embodiment 156 of the internal functional signal processing circuitry of the present invention FCB device 150. In this embodiment 156, the FCB device 150 includes three FCBs 160, 170 and 180. The first FCB 160 has a first input 161, a second input 163 and an output 165. The second FCB 170 also has a first input 171, a second input 173 and an output 175. The third FCB 180 has an input 181, a first output 185 and a second output 187.

The first input 161 of the first FCB 160 is coupled to the first input A of FCB device 150, and the second input 163 of the first FCB 160 is coupled to the first output 185 of the third FCB 180. Therefore, the first input signal X1 of the first FCB 160 is the output signal of the signal regulator 110, and the second input signal Y1 of the first FCB 160 is the first output signal Z31 of the third FCB 180. The output signal Z1 at the output 165 of the first FCB 160 is a function (F1) of the first and second input signals X1 and Yi:

$$Z1=F1 (X1, Y1)$$

The first input 171 of the second FCB 170 is coupled to the signal reference 190, and the second input 173 of the second FCB 170 is coupled to the second output of the third FCB 180. Therefore, the first input signal X2 of the second FCB 170 is the reference signal of signal reference 190, and the second input signal Y2 of the second FCB 170 is the second output signal Z32 of the third FCB 180. The output signal Z2 at the output 175 of the second FCB 170 is a function (F2) of the first and second input signals X2 and Y2:

$$Z2=F2 (X2, Y2)$$

The input 181 of the third FCB 180 is coupled to the second input B of the FCB device 150. Therefore, the input signal X3 of the third FCB 180 is the outer servo loop control signal of the outer servo loop 140. The first output signal Z31 at the output 185 of the third FCB 180 is a function (F31) of the input signal X3:

$$Z31=F31 (X3)$$

and the second output signal Z32 at the output 187 of the third FCB 180 is also a function (F32) of the input signal X3:

$$Z32=F32 (X3)$$

Accordingly, it can be seen that the output signal Z1 of the first FCB 160 which is also the first output signal delivered at the first output C of the FCB device 150 is a function (F13) of the first input signal X1 of the first FCB 160 which is also the output signal of signal regulator 110 received at the first input of the FCB device 150, and the input signal X3 of the third FCB 180 which is also the outer servo loop control signal received at the second input B of the FCB device 150:

$$Z1=F13 (X1, X3)$$

and the output signal Z2 of the second FCB 170 which is also the second output signal delivered at the first output D of the FCB device 150 is a function (F23) of the first input signal X2 of the second FCB 170 which is also the reference signal of signal reference 190, and the input signal X3 of the third FCB 180 which is also the outer servo loop control signal received at the second input B of the FCB device 150:

$$Z2=F23 (X2, X3)$$

Figure 6:
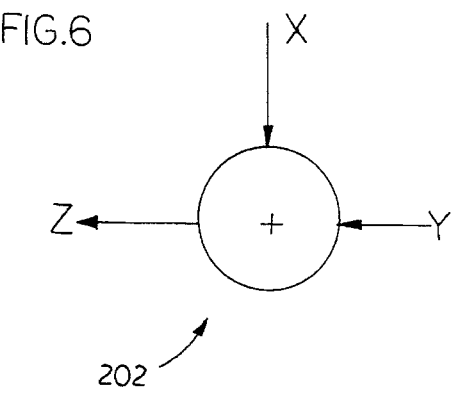
FIG. 6 is an example of the internal functional signal processing circuitry of the present invention functional control block device.
Figure 7:
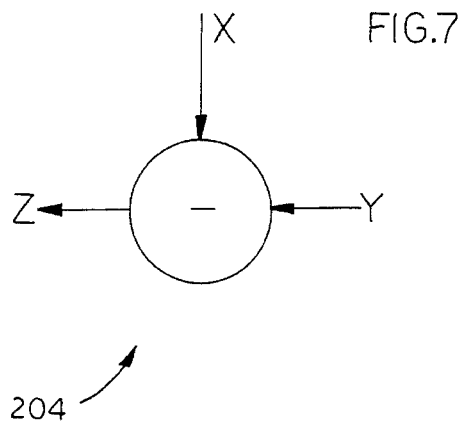
FIG. 7 is another example of the internal functional signal processing circuitry of the present invention functional control block device.
Figure 8:
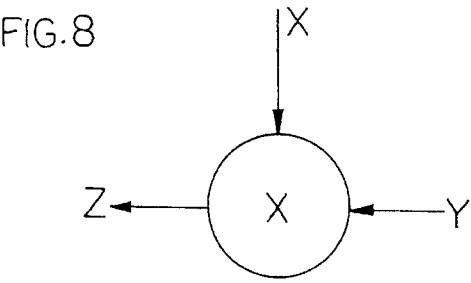
FIG. 8 is a further example of the internal functional signal processing circuitry of the present invention functional control block device.
Figure 9:
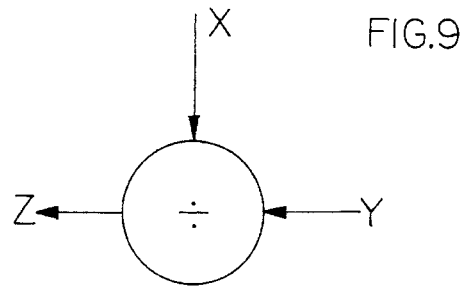
FIG. 9 is an additional example of the internal functional signal processing circuitry of the present invention functional control block device.
Figure 10:
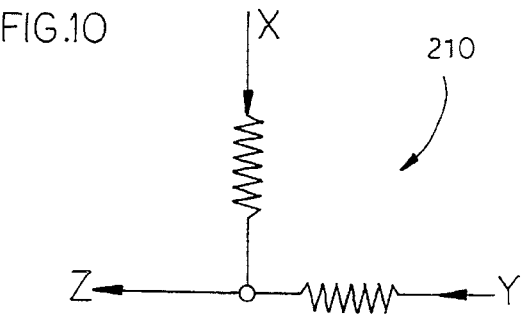
FIG. 10 is still another example of the internal functional signal processing circuitry of the present invention functional control block device.
Figure 11:
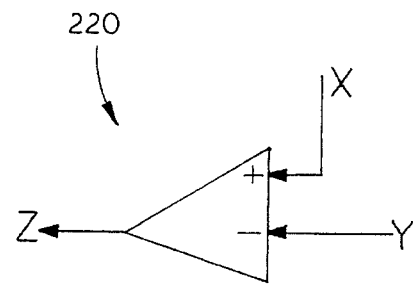
FIG. 11 is still another example of the internal functional signal processing circuitry of the present invention functional control block device.
Figure 12:
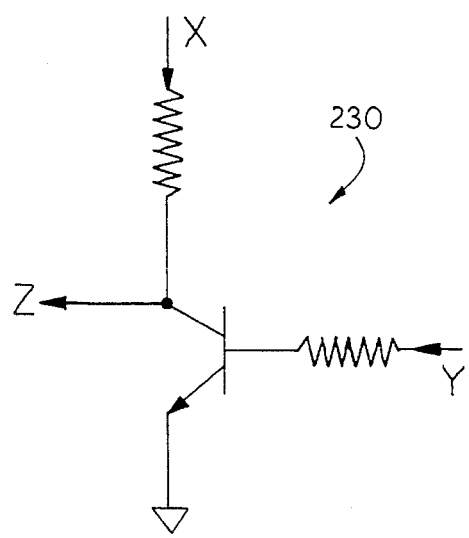
FIG. 12 is still another example of the internal functional signal processing circuitry of the present invention functional control block device.
Figure 13:
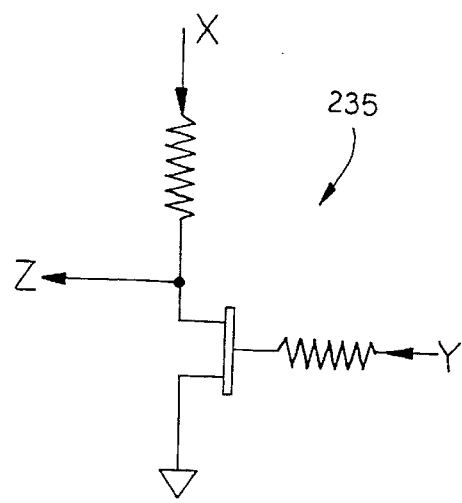
FIG. 13 is still another example of the internal functional signal processing circuitry of the present invention functional control block device.
Figure 14:
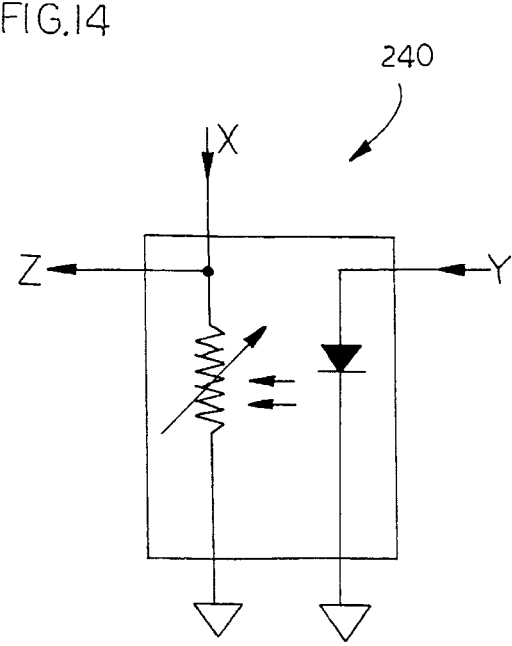
FIG. 14 is still another example of the internal functional signal processing circuitry of the present invention functional control block device.
Figure 15:
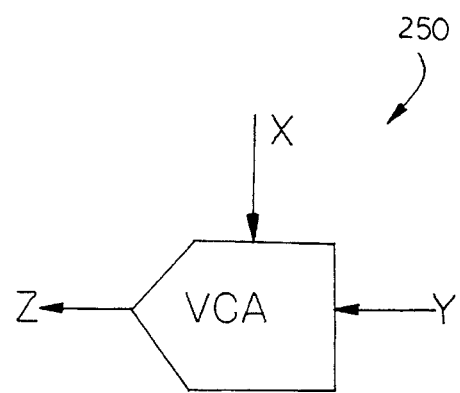
FIG. 15 is still another example of the internal functional signal processing circuitry of the present invention functional control block device.
Figure 16:
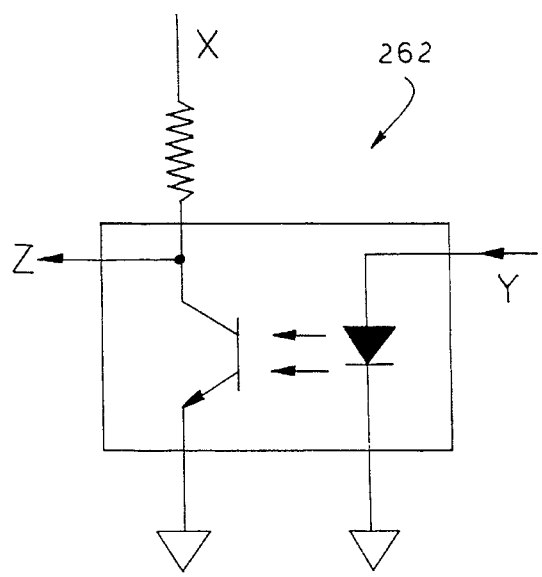
FIG. 16 is still another example of the internal functional signal processing circuitry of the present invention functional control block device.
Figure 17:
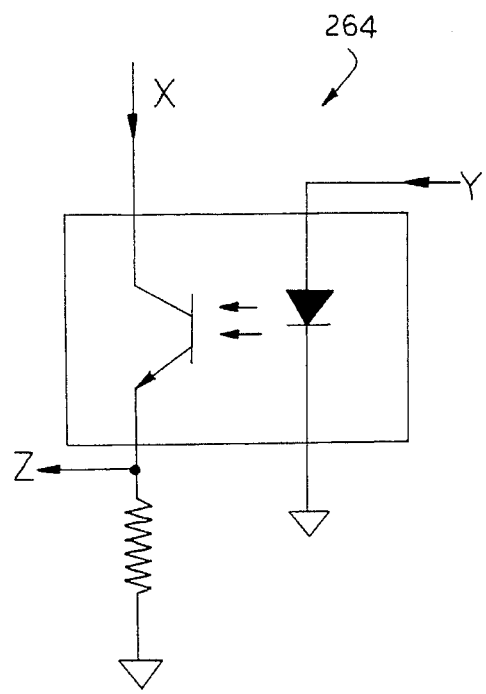
FIG. 17 is still another example of the internal functional signal processing circuitry of the present invention functional control block device.
Figure 18:
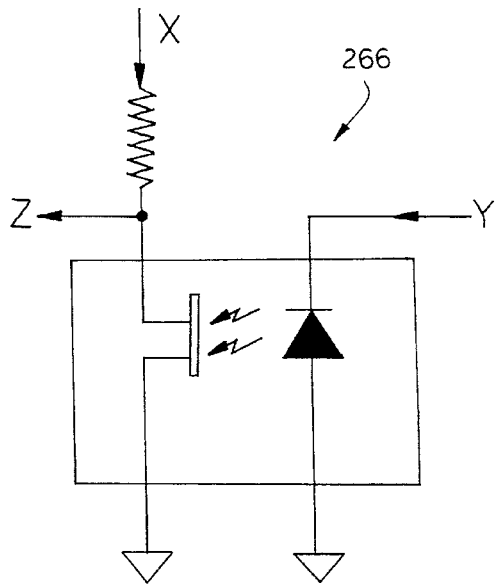
FIG. 18 is still another example of the internal functional signal processing circuitry of the present invention functional control block device.
Figure 19:
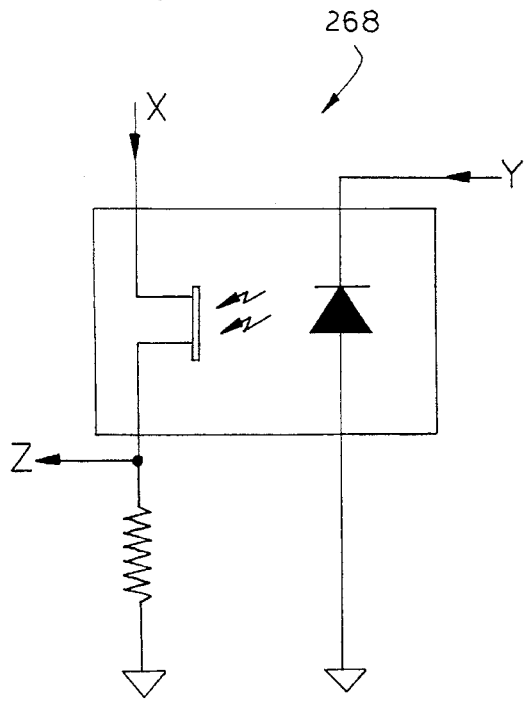
FIG. 19 is still another example of the internal functional signal processing circuitry of the present invention functional control block device.

FIGS. 6 through 19 illustrate various examples of the FCBs which may be utilized in the present invention. FIG. 6 shows an adding FCB 202. FIG. 7 shows a subtracting FCB 204. FIG. 8 shows a multiplying FCB 206. FIG. 9 shows a dividing FCB 208. FIG. 10 shows a resistive summing FCB 210. FIG. 11 shows a differential amplifier FCB 220. FIG. 12 shows a transistor FCB 230. FIG. 13 shows a JFET FCB 235. FIG. 14 shows a light dependent resistor FCB 240. FIG. 15 shows a voltage controlled amplifier FCB 250. FIG. 16 shows an optoisolator FCB 262. FIG. 17 shows another optoisolator FCB 264. FIG. 18 shows still another optoisolator FCB 266. FIG. 19 shows still another optoisolator FCB 268.

In all FCBs illustrated in FIGS. 6 through 19, each FCB receives two input signals X and Y and produces an output signal Z. The output signal Z is a function (F) of the two input signals X and Y:

$$Z=F (X, Y)$$

It can be seen that these sample FCB's are adapted to be readily utilized either individually or in combination as the FCBs 160, 170 and 180 of the internal functional processing circuitry of the FCB device 150.

Defined in detail, the present invention is a signal regulating apparatus comprising: (a) a signal regulator having an input, an output and a control terminal for receiving an input signal at its input, generating an output signal at its output, and delivering an actual signal on a load through an external conductor; (b) an inner servo loop having a sense input, a reference input, and an output connected to the control terminal of the signal regulator for generating an inner servo loop control signal, and delivering the inner servo loop control signal to the signal regulator to control the output signal of the signal regulator; (c) an outer servo loop having an input connected to the load and an output for generating an outer servo loop control signal which is responsive to the actual signal on the load, and delivering the outer servo loop control signal; (d) a functional control block device having a first input, a second input, a first output and a second output and an internal functional signal processing circuity; (e) the first input of the functional control block device connected to the output of the signal regulator for receiving the output signal from the signal regulator; (f) the second input of the functional control block device connected to the output of the outer servo loop for receiving the outer servo loop control signal from the outer servo loop; (g) the functional control block device having an internal functional signal processing circuity for processing the output signal of the signal regulator and the outer servo loop control signal of the outer servo loop and producing a functional sense signal and a functional reference signal; (h) the first output of the functional control block device connected to the sense input of the inner servo loop for delivering the functional sense signal to the inner servo loop; and (i) the second output of the functional control block device connected to the reference input of the inner servo loop for delivering the functional reference signal to the inner servo loop; (j) whereby the functional sense signal and the functional reference signal produced by the functional control block device are functions of the output signal of the signal regulator and the actual signal on the load.

Defined broadly, the present invention is a functional control block device for use in conjunction with a signal regulating apparatus that includes a signal regulator having an input, an output and a control terminal for receiving an input signal at its input and generating an output signal at its output and delivering an actual signal on a load through an external conductor, an inner servo loop having a sense input and a reference input, and an output connected to the control terminal of the signal regulator for generating and delivering an inner servo loop control signal to the signal regulator to control the output signal of the signal regulator, and an outer servo loop having an input connected to the load and an output for generating and delivering an outer servo loop control signal which is responsive to the actual signal on the load, the functional control block device comprising: (a) a first input connected to the output of the signal regulator for receiving the output signal from the signal regulator; (b) a second input connected to the output of the outer servo loop for receiving the outer servo loop control signal from the outer servo loop; (c) an internal functional signal processing circuity for processing the output signal of the signal regulator and the outer servo loop control signal of the outer servo loop and producing a functional sense signal and a functional reference signal; (d) a first output connected to the sense input of the inner servo loop for delivering the functional sense signal to the inner servo loop; and (e) a second output connected to the reference input of the inner servo loop for delivering the functional reference signal to the inner servo loop; (f) whereby the functional sense signal and the functional reference signal produced by the functional control block device are functions of the output signal of the signal regulator and the actual signal on the load.

Defined also broadly, the present invention is a method for improving the performance of a signal regulator circuit that includes a signal regulator having an input, an output and a control terminal for receiving an input signal at its input and generating an output signal at its output and delivering an actual signal on a load through an external conductor, an inner servo loop having a sense input and a reference input, and an output connected to the control terminal of the signal regulator for generating and delivering an inner servo loop control signal to the signal regulator to control the output signal of the signal regulator, and an outer servo loop having an input connected to the load and an output for generating and delivering an outer servo loop control signal which is responsive to the actual signal on the load, the method comprising the steps of: (a) providing a functional control block having a first input, a second input, a first output and a second output; (b) connecting the first input of the functional control block to the output of the signal regulator for receiving the output signal from the signal regulator; (c) connecting the second input of the functional control block to the output of the outer servo loop for receiving the outer servo loop control signal from the outer servo loop; (d) providing an internal functional signal processing circuity in the functional control block for processing the output signal of the signal regulator and the outer servo loop control signal of the outer servo loop and producing a functional sense signal and a functional reference signal; (e) connecting the first output of the functional control block to the sense input of the inner servo loop for delivering the functional sense signal to the inner servo loop; and (f) connecting the second output of the functional control block to the reference input of the inner servo loop for delivering the functional reference signal to the inner servo loop; (g) whereby the functional sense signal and the functional reference signal produced by the functional control block are functions of the output signal of the signal regulator and the actual signal on the load.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A functional control block device for use in conjunction with a signal regulating apparatus that includes a signal regulator having an input, an output and a control terminal for receiving an input signal at its input and generating an output signal at its output and delivering an actual signal on a load through an external conductor, an inner servo loop having a sense input and a reference input, and an output connected to the control terminal of the signal regulator for generating and delivering an inner servo loop control signal to the signal regulator to control the output signal of the signal regulator, and an outer servo loop having an input connected to the load and an output for generating and delivering an outer servo loop control signal which is responsive to the actual signal on the load, the functional control block device comprising:
    a. a first input connected to said output of said signal regulator for receiving said output signal from said signal regulator;
    b. a second input connected to said output of said outer servo loop for receiving said outer servo loop control signal from said outer servo loop;
    c. an internal functional signal processing circuity for processing said output signal of said signal regulator and said outer servo loop control signal of said outer servo loop and producing a functional sense signal and a functional reference signal;
    d. a first output connected to said sense input of said inner servo loop for delivering said functional sense signal to said inner servo loop; and
    e. a second output connected to said reference input of said inner servo loop for delivering said functional reference signal to said inner servo loop;
    f. whereby said functional sense signal and said functional reference signal produced by said functional control block device are functions of said output signal of said signal regulator and said actual signal on said load.

2. The device as defined in claim 1 wherein said internal functional signal processing circuity includes:
    a. a first functional control block having a first input coupled to said first input of said functional control block device for receiving said output signal from said signal regulator, a second input coupled to said second input of said functional control block device for receiving said outer servo loop control signal from said outer servo loop, and an output coupled to said first output of said functional control block device, where the first functional control block produces said functional sense signal as a function of said output signal and said outer servo loop control signal; and
    b. a second functional control block having an input coupled to a signal reference which provides a reference signal, and an output coupled to said second output of said functional control block device, where the second functional control block produces said functional reference signal as a function of the reference signal.

3. The device as defined in claim 1 wherein said internal functional signal processing circuity includes:
    a. a first functional control block having an input coupled to said first input of said functional control block device for receiving said output signal from said signal regulator, and an output coupled to said first output of said functional control block device, where the first functional control block produces said functional sense signal as a function of said output signal; and
    b. a second functional control block having a first input coupled to a signal reference which provides a reference signal, a second input coupled to said second input of said functional control block device for receiving said outer servo loop control signal from said outer servo loop, and an output coupled to said second output of said functional control block device, where the second functional control block produces said functional reference signal as a function of the reference signal and said outer servo loop control signal.

4. The device as defined in claim 1 wherein said internal functional signal processing circuity includes:
    a. a first functional control block having a first input coupled to said first input of said functional control block device for receiving said output signal from said signal regulator, a second input, and an output coupled to said first output of said functional control block device;
    b. a second functional control block having a first input coupled to a signal reference which provides a reference signal, a second input, and an output coupled to said second output of said functional control block device;
    c. a third functional control block having an input coupled to said second input of said functional control block device for receiving said outer servo loop control signal from said outer servo loop, a first output coupled to said second input of said first functional control block, and a second output coupled to said second input of said second functional control block;
    d. where said third functional control block produces a first output signal as a function of said outer servo loop control signal, and a second output signal also as a function of said outer servo loop control signal;
    e. where said first functional control block produces said functional sense signal as a function of said output signal of said signal regulator and said first output signal of said third functional control block; and f. where said second functional control block produces said functional reference signal as a function of said reference signal of said signal reference and said second output signal of said third functional control block.

5. The device as defined in claim 1 wherein said internal functional signal processing circuity includes an adding functional control block.

6. The device as defined in claim 1 wherein said internal functional signal processing circuity includes a subtracting functional control block.

7. The device as defined in claim 1 wherein said internal functional signal processing circuity includes a multiplying functional control block.

8. The device as defined in claim 1 wherein said internal functional signal processing circuity includes a dividing functional control block.

9. The device as defined in claim 1 wherein said internal functional signal processing circuity includes a resistive summing functional control block.

10. The device as defined in claim 1 wherein said internal functional signal processing circuity includes a differential amplifier functional control block.

11. The device as defined in claim 1 wherein said internal functional signal processing circuity includes a transistor functional control block.

12. The device as defined in claim 1 wherein said internal functional signal processing circuity includes a JFET functional control block.

13. The device as defined in claim 1 wherein said internal functional signal processing circuity includes a light dependent resistor functional control block.

14. The device as defined in claim 1 wherein said internal functional signal processing circuity includes a voltage controlled amplifier functional control block.

15. The device as defined in claim 1 wherein said internal functional signal processing circuity includes an optoisolator functional control block.

16. A signal regulating apparatus comprising:
   a. a signal regulator having an input, an output and a control terminal for receiving an input signal at its input, generating an output signal at its output, and delivering an actual signal on a load through an external conductor;
   b. an inner servo loop having a sense input, a reference input, and an output connected to said control terminal of said signal regulator for generating an inner servo loop control signal, and delivering the inner servo loop control signal to said signal regulator to control said output signal of said signal regulator;
   c. an outer servo loop having an input connected to the load and an output for generating an outer servo loop control signal which is responsive to said actual signal on said load, and delivering said outer servo loop control signal;
   d. a functional control block device having a first input, a second input, a first output and a second output;
   e. said first input of said functional control block device connected to said output of said signal regulator for receiving said output signal from said signal regulator;
   f. said second input of said functional control block device connected to said output of said outer servo loop for receiving said outer servo loop control signal from said outer servo loop;
   g. said functional control block device having an internal functional signal processing circuity for processing said output signal of said signal regulator and said outer servo loop control signal of said outer servo loop and producing a functional sense signal and a functional reference signal;
   h. said first output of said functional control block device connected to said sense input of said inner servo loop for delivering said functional sense signal to said inner servo loop; and
   i. said second output of said functional control block device connected to said reference input of said inner servo loop for delivering said functional reference signal to said inner servo loop;
   j. whereby said functional sense signal and said functional reference signal produced by said functional control block device are functions of said output signal of said signal regulator and said actual signal on said load.

17. The apparatus as defined in claim 16 wherein said signal regulator is a switch mode voltage regulator.

18. The apparatus as defined in claim 16 wherein said inner servo loop includes an inner servo loop comparator and an inner servo loop filter.

19. The apparatus as defined in claim 16 wherein said outer servo loop includes an outer servo loop comparator and an outer servo loop filter.

20. The apparatus as defined in claim 16 wherein said internal functional signal processing circuity includes:
   a. a first functional control block having a first input coupled to said first input of said functional control block device for receiving said output signal from said signal regulator, a second input coupled to said second input of said functional control block device for receiving said outer servo loop control signal from said outer servo loop, and an output coupled to said first output of said functional control block device, where the first functional control block produces said functional sense signal as a function of said output signal and said outer servo loop control signal; and
   b. a second functional control block having an input coupled to a signal reference which provides a reference signal, and an output coupled to said second output of said functional control block device, where the second functional control block produces said functional reference signal as a function of the reference signal.

21. The apparatus as defined in claim 16 wherein said internal functional signal processing circuity includes:
   a. a first functional control block having an input coupled to said first input of said functional control block device for receiving said output signal from said signal regulator, and an output coupled to said first output of said functional control block device, where the first functional control block produces said functional sense signal as a function of said output signal; and
   b. a second functional control block having a first input coupled to a signal reference which provides a reference signal, a second input coupled to said second input of said functional control block device for receiving said outer servo loop control signal from said outer servo loop, and an output coupled to said second output of said functional control block device, where the second functional control block produces said functional reference signal as a function of the reference signal and said outer servo loop control signal.

22. The apparatus as defined in claim 16 wherein said internal functional signal processing circuity includes:
   a. a first functional control block having a first input coupled to said first input of said functional control block device for receiving said output signal from said signal regulator, a second input, and an output coupled to said first output of said functional control block device;

b. a second functional control block having a first input coupled to a signal reference which provides a reference signal, a second input, and an output coupled to said second output of said functional control block device;

c. a third functional control block having an input coupled to said second input of said functional control block device for receiving said outer servo loop control signal from said outer servo loop, a first output coupled to said second input of said first functional control block, and a second output coupled to said second input of said second functional control block;

d. where said third functional control block produces a first output signal as a function of said outer servo loop control signal, and a second output signal also as a function of said outer servo loop control signal;

e. where said first functional control block produces said functional sense signal as a function of said output signal of said signal regulator and said first output signal of said third functional control block; and f. where said second functional control block produces said functional reference signal as a function of said reference signal of said signal reference and said second output signal of said third functional control block.

23. The apparatus as defined in claim 16 wherein said internal functional signal processing circuity includes an adding functional control block.

24. The apparatus as defined in claim 16 wherein said internal functional signal processing circuity includes a subtracting functional control block.

25. The apparatus as defined in claim 16 wherein said internal functional signal processing circuity includes a multiplying functional control block.

26. The apparatus as defined in claim 16 wherein said internal functional signal processing circuity includes a dividing functional control block.

27. The apparatus as defined in claim 16 wherein said internal functional signal processing circuity includes a resistive summing functional control block.

28. The apparatus as defined in claim 16 wherein said internal functional signal processing circuity includes a differential amplifier functional control block.

29. The apparatus as defined in claim 16 wherein said internal functional signal processing circuity includes a transistor functional control block.

30. The apparatus as defined in claim 16 wherein said internal functional signal processing circuity includes a JFET functional control block.

31. The apparatus as defined in claim 16 wherein said internal functional signal processing circuity includes a light dependent resistor functional control block.

32. The apparatus as defined in claim 16 wherein said internal functional signal processing circuity includes a voltage controlled amplifier functional control block.

33. The apparatus as defined in claim 16 wherein said internal functional signal processing circuity includes an optoisolator functional control block.

34. A method for improve the performance of a signal regulator circuit that includes a signal regulator having an input, an output and a control terminal for receiving an input signal at its input and generating an output signal at its output and delivering an actual signal on a load through an external conductor, an inner servo loop having a sense input and a reference input, and an output connected to the control terminal of the signal regulator for generating and delivering an inner servo loop control signal to the signal regulator to control the output signal of the signal regulator, and an outer servo loop having an input connected to the load and an output for generating and delivering an outer servo loop control signal which is responsive to the actual signal on the load, the method comprising the steps of:

a. providing a functional control block having a first input, a second input, a first output and a second output;

b. connecting said first input of said functional control block to said output of said signal regulator for receiving said output signal from said signal regulator;

c. connecting said second input of said functional control block to said output of said outer servo loop for receiving said outer servo loop control signal from said outer servo loop;

d. providing an internal functional signal processing circuity in said functional control block for processing said output signal of said signal regulator and said outer servo loop control signal of said outer servo loop and producing a functional sense signal and a functional reference signal;

e. connecting said first output of said functional control block to said sense input of said inner servo loop for delivering said functional sense signal to said inner servo loop; and f. connecting said second output of said functional control block to said reference input of said inner servo loop for delivering said functional reference signal to said inner servo loop;

g. whereby said functional sense signal and said functional reference signal produced by said functional control block are functions of said output signal of said signal regulator and said actual signal on said load.

35. The method as defined in claim 34 further comprising the steps of:

a. providing a first functional control block in said internal functional signal processing circuitry, the first functional control block having a first input coupled to said first input of said functional control block device for receiving said output signal from said signal regulator, a second input coupled to said second input of said functional control block device for receiving said outer servo loop control signal from said outer servo loop, and an output coupled to said first output of said functional control block device, where the first functional control block produces said functional sense signal as a function of said output signal and said outer servo loop control signal; and b. providing a second functional control block in said internal functional signal processing circuitry, the second functional control block having an input coupled to a signal reference which provides a reference signal, and an output coupled to said second output of said functional control block device, where the second functional control block produces said functional reference signal as a function of the reference signal.

36. The method as defined in claim 34 further comprising the steps of:

a. providing a first functional control block in said internal functional signal processing circuity, the first functional control block having an input coupled to said first input of said functional control block device for receiving said output signal from said signal regulator, and an output coupled to said first output of said functional control block device, where the first functional control block produces said functional sense signal as a function of said output signal; and b. providing a second functional control block in said internal functional signal processing circuity, the first functional control block having a first input coupled to a signal reference which provides a reference signal, a second input coupled to said second input of said functional control block device for receiving said outer servo loop control signal from said outer servo loop, and an output coupled to said second output of said functional control block device, where the second functional control block produces said functional reference signal as a function of the reference signal and said outer servo loop control signal.

37. The method as defined in claim 34 further comprising the steps of:

a. providing a first functional control block in said internal functional signal processing circuity, the functional control block having a first input coupled to said first input of said functional control block device for receiving said output signal from said signal regulator, a second input, and an output coupled to said first output of said functional control block device;

b. providing a second functional control block in said internal functional signal processing circuity, the functional control block having a first input coupled to a signal reference which provides a reference signal, a second input, and an output coupled to said second output of said functional control block device;

c. providing a third functional control block in said internal functional signal processing circuity, the functional control block having an input coupled to said second input of said functional control block device for receiving said outer servo loop control signal from said outer servo loop, a first output coupled to said second input of said first functional control block, and a second output coupled to said second input of said second functional control block;

d. where said third functional control block produces a first output signal as a function of said outer servo loop control signal, and a second output signal also as a function of said outer servo loop control signal;

e. where said first functional control block produces said functional sense signal as a function of said output signal of said signal regulator and said first output signal of said third functional control block; and f. where said second functional control block produces said functional reference signal as a function of said reference signal of said signal reference and said second output signal of said third functional control block.

38. The method as defined in claim 34 further comprising the step of utilizing an adding functional control block in said internal functional signal processing circuity.

39. The method as defined in claim 34 further comprising the step of utilizing a subtracting functional control block in said internal functional signal processing circuity.

40. The method as defined in claim 34 further comprising the step of utilizing a multiplying functional control block in said internal functional signal processing circuity.

41. The method as defined in claim 34 further comprising the step of utilizing a dividing functional control block in said internal functional signal processing circuity.

42. The method as defined in claim 34 further comprising the step of utilizing a resistive summing functional control block in said internal functional signal processing circuity.

43. The method as defined in claim 34 further comprising the step of utilizing a differential amplifier functional control block in said internal functional signal processing circuity.

44. The method as defined in claim 34 further comprising the step of utilizing a transistor functional control block in said internal functional signal processing circuity.

45. The method as defined in claim 34 further comprising the step of utilizing a JFET functional control block in said internal functional signal processing circuity.

46. The method as defined in claim 34 further comprising the step of utilizing a light dependent resistor functional control block in said internal functional signal processing circuity.

47. The method as defined in claim 34 further comprising the step of utilizing a voltage controlled amplifier functional control block in said internal functional signal processing circuity.

48. The method as defined in claim 34 further comprising the step of utilizing an optoisolator functional control block in said internal functional signal processing circuity.

* * * * *